UNITED STATES PATENT OFFICE.

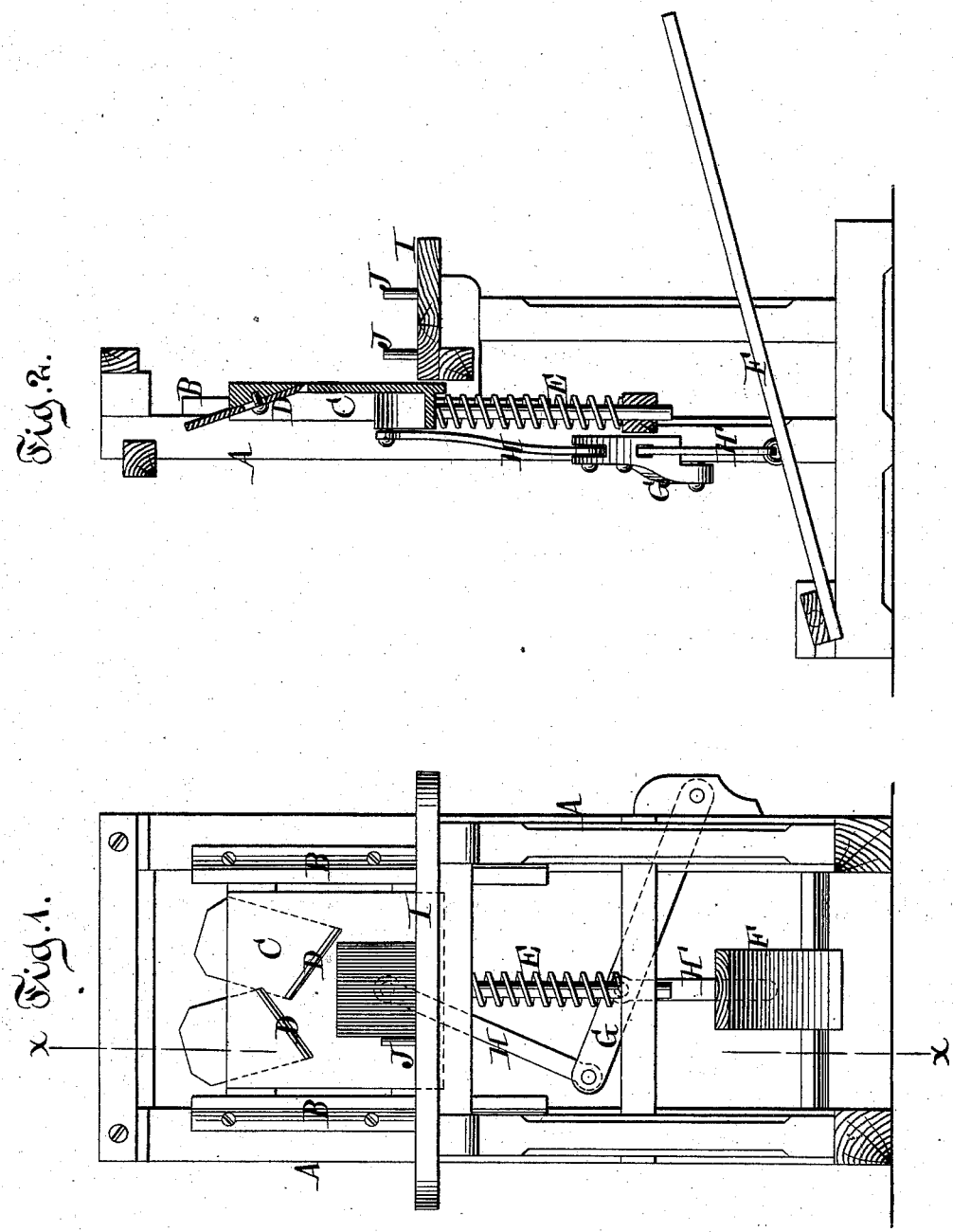

JULIUS MANNEBACH, OF NEW YORK, ASSIGNOR OF ONE-HALF HIS RIGHT TO HENRY C. STONE, OF BROOKLYN, N. Y.

IMPROVEMENT IN BOX-PLANING MACHINES.

Specification forming part of Letters Patent No. 205,401, dated June 25, 1878; application filed April 17, 1878.

*To all whom it may concern:*

Be it known that I, JULIUS MANNEBACH, of the city, county, and State of New York, have invented a new and useful Improvement in Box-Planers, which invention is fully set forth in the following specification, reference being had to the accompanying drawing, in which—

Figure 1 represents a front elevation of a machine embracing my invention. Fig. 2 is a vertical cross-section thereof in the line $x\ x$, Fig. 1.

Similar letters indicate corresponding parts.

The object of my invention is to produce a machine which is especially adapted for planing wooden boxes; and it consists in a plane carrying two oblique knives, the cutting-edges of which extend upward and inward, each extending inwardly beyond the line at which the other terminates, in combination with vertical ways for guiding the plane, mechanism for imparting thereto a reciprocating motion, and a platform for supporting the box to be planed, so that when a box is placed on the platform so as to bring one side thereof in the path of the plane, the box can be thereby smoothed or planed off, the knives of the plane being caused to cut from the outer edges of the box inward, and the entire side of the box being thereby subjected to the action of the knives.

In the drawing, the letter A designates the frame of my machine, constructed with vertical ways B B, in which moves the plane C. This plane has two oblique knives or irons, D D, which are fastened in the usual manner, and the cutting-edges of which extend upward and inward, each extending inwardly beyond the line at which the other terminates, as clearly shown in Fig. 1, in contradistinction to their being arranged to extend outward in an upper direction.

For the purpose of imparting a reciprocating motion to the plane C, I arrange the same on a supporting-spring, E, resting on a cross-piece of the frame A, and connect the same to a treadle, F, by means of a lever, G, and links H H'. The plane, however, can be operated in other ways, and, if desired, it can be worked by steam-power.

To a suitable part of the frame A is secured a platform, I, to support the box to be planed; and this platform is preferably provided with pins J, or their equivalent devices, to form a lateral support or rest for the box.

When a box is placed on the platform I in such a manner that one of its sides is brought adjacent to the plane C, this side of the box can be smoothed by causing the plane to descend, and, by the peculiar arrangement of the planing-knives D D, the same are caused to cut from the outer edges of the box inward, whereby the whole side thereof facing the knives is planed off.

When the planing-knives D D are arranged at right angles, or nearly so, to the position shown, and do not lap each other, as in miter-planing machines, the planing of a box is but imperfectly performed thereby, inasmuch as a streak or unplaned portion is left in the center of the box. This is obviated by arranging the planing-knives according to my invention.

Box-finishing machines have heretofore been constructed with their plane-blades inclined, but not lapping each other, and therefore left unplaned streaks or gave the side of the box an uneven appearance.

What I claim as new, and desire to secure by Letters Patent, is—

The combination, in a box-planer, of a plane carrying two oblique knives, the cutting-edges of which extend upward and inward, each extending inwardly beyond the line at which the other terminates, vertical ways for guiding such plane, mechanism for imparting thereto a reciprocating motion, and a platform for supporting the box to be planed, all constructed to operate substantially as described.

In testimony that I claim the foregoing I have hereunto set my hand and seal this 8th day of April, 1878.

JULIUS MANNEBACH. [L. S.]

Witnesses:
W. HAUFF,
E. F. KASTENHUBER.